Sept. 26, 1967 A. H. PINKE 3,343,795
THRUSTLESS SPRAY CONTROL VALVE
Filed Jan. 11, 1965 2 Sheets-Sheet 1

INVENTOR.
AUGUST H. PINKE
BY
Kane, Dalsimer & Kane
ATTORNEYS

Sept. 26, 1967  A. H. PINKE  3,343,795
THRUSTLESS SPRAY CONTROL VALVE
Filed Jan. 11, 1965  2 Sheets-Sheet 2

INVENTOR.
AUGUST H. PINKE
BY
Kane, Dalsimer & Kane
ATTORNEYS

United States Patent Office 3,343,795
Patented Sept. 26, 1967

3,343,795
THRUSTLESS SPRAY CONTROL VALVE
August H. Pinke, Hastings, Minn., assignor to H. D. Hudson Manufacturing Company, Chicago, Ill., a corporation of Minnesota
Filed Jan. 11, 1965, Ser. No. 424,528
5 Claims. (Cl. 239—152)

ABSTRACT OF THE DISCLOSURE

A sprayer of the type having a container with liquid under pressure includes a flexible hose connected with an extension tube having an outlet nozzle for directing the desired spray pattern onto the selected target. A leak-proof thrustless spray control valve is interposed between the hose and exterior tube to control the amount of liquid passing through the system. The valve includes a reciprocal spring biased rod the rear end of which is exposed and disposed in a bearing to asure an optimum seal about the rod and rear of the valve body. A lever is also pivotally coupled with the rod and, when shifted, serves to actuate the rod to open and close the valve. A lateral leg extension of the valve body is provided with a handle connected with the hose for holding the valve and facilitating the shifting of the lever.

This invention relates to an improvement in spray control valves and, more particularly, to a spray control valve actuated by a pivotal lever in a manner whereby the action on the valve stem is thrustless. In the art of spray control valves, it is common practice to couple the rear end of a valve stem to a pivotal thumb lever for purposes of unseating a valve against the bias of a compression spring to permit lquid flow. The valve stem passes through the valve body at the rear of the valve chamber, and at this point, internally, there must be a suitable packing, or gasketing, in order to prevent liquid, under pressure, from passing from the valve chamber, around the valve stem, where it passes through the valve housing.

Leakage at this mentioned point has been one of the prime weaknesses of manually-actuated spray control valves. In a pivotal action such as is inherent in such designs, there is a thrust applied on the valve stem as the valve is open by means of the actuation of the lever. The major reason for leakage occurring at this point has been found to be due to a distortion of the packing, or gasket, by this thrust action of the valve stem on the gasket, or packing, particularly after repeated actuations of opening and closing of the valve. Frequently chemicals have been known to pass through the valve which, if allowed to contaminate the hand of the operator, by such as valve leakage, would not be in the best interests of the operator's safety.

It is, therefore, a primary object of this invention to provide a leak-proof spray control valve by minimizing, if not by eliminating entirely, such distortion of the mentioned gaskets or packing, caused by valve stem thrust by providing a substantially thrustless spray control valve construction.

Another object is to provide a thrustless spray control valve of this type requiring an assembly of a minimum number of parts each individually simple to construct whereby relatively low cost, yet accurate and structurally sound construction is provided.

A thrustless valve assembly in accordance with this invention includes a valve body having a passage therein adapted to be closed by a valve member urged into engagement with a valve seat by means of a compression spring. A valve stem extends rearwardly from the valve member and outwardly of the valve body. The body includes an integral extension at its rear end. This extension is provided with a bore disposed substantially coaxial with the valve stem. A suitably constructed bearing of such as Teflon is disposed in the bore and mounted as a part of the extension and conveniently receives the rear end of the valve stem. A thumb lever is pivotally mounted on surfaces of the valve body and, at the same time, is coupled with the outer end of the valve stem. Depression of the lever about its pivotal connection with the valve body will result in retraction of the valve stem which is now permitted to slide in the mentioned bearing in a substantially thrustless manner.

Other objects and advantages will become apparent from the following detailed description used to be taken in conjunction with the accompanying drawings illustrating a somewhat preferred embodiment of the invention and in which.

Figure 2:
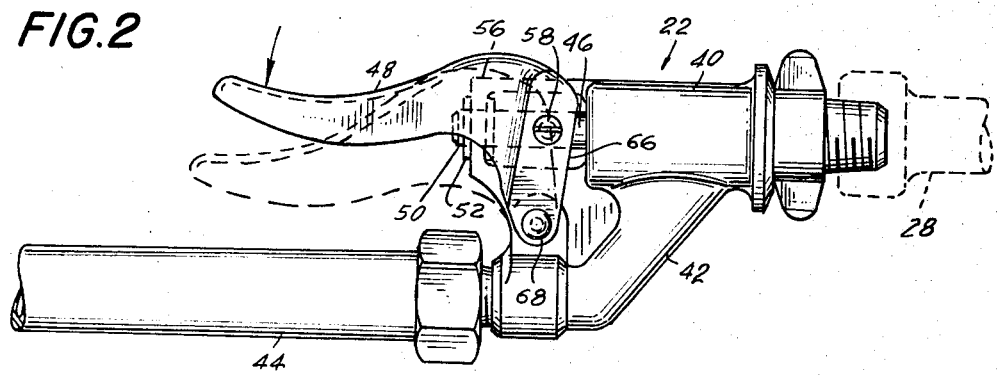
FIG. 2 is an enlarged fragmentary elevational view of the thrustless spray control valve in closed position with the valve open position being depicted by dotted lines.
Figure 3:
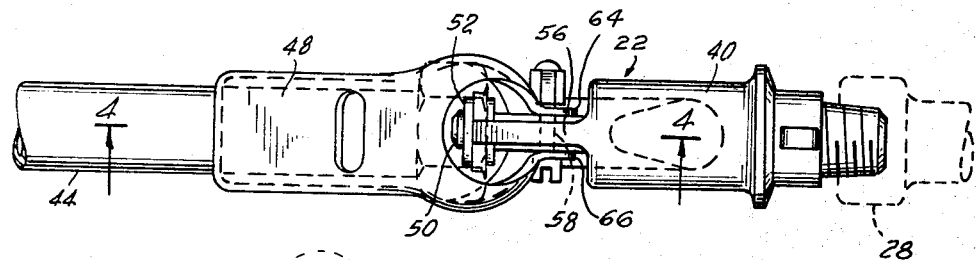
FIG. 3 is a top plan view thereof.
Figure 1:
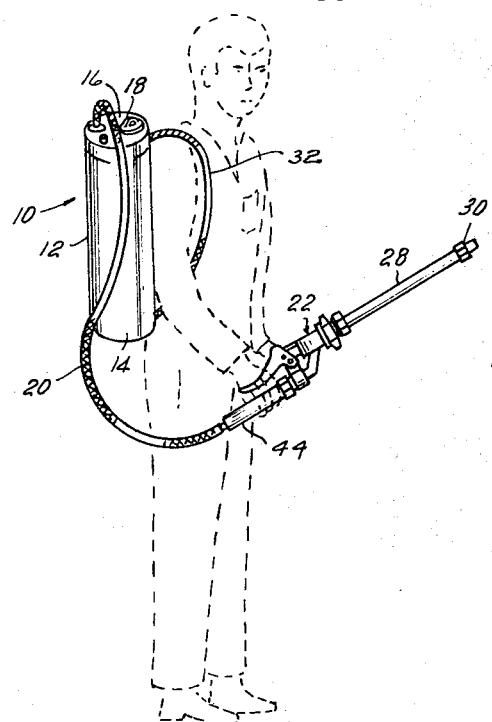
FIG. 1 is a perspective view of a garden sprayer incorporating therein the thrustless pray control valve of this invention.
Figure 4:
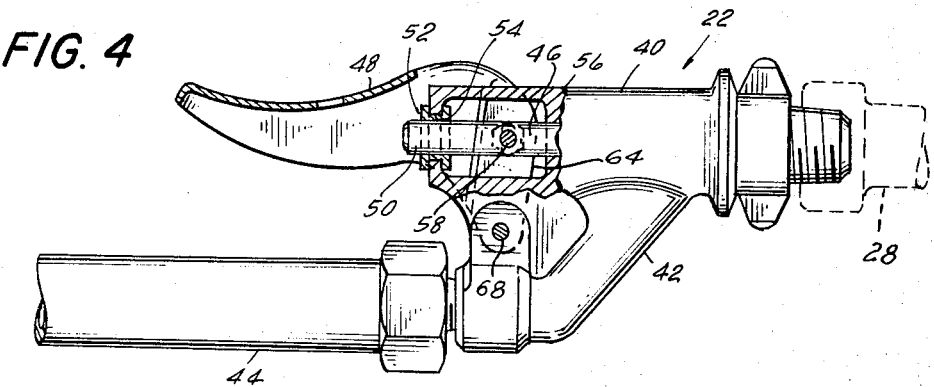
FIG. 4 is a side elevational view with certain parts broken away and removed and with other parts being sectioned taken along the line 4—4 of FIG. 3.
Figure 5:
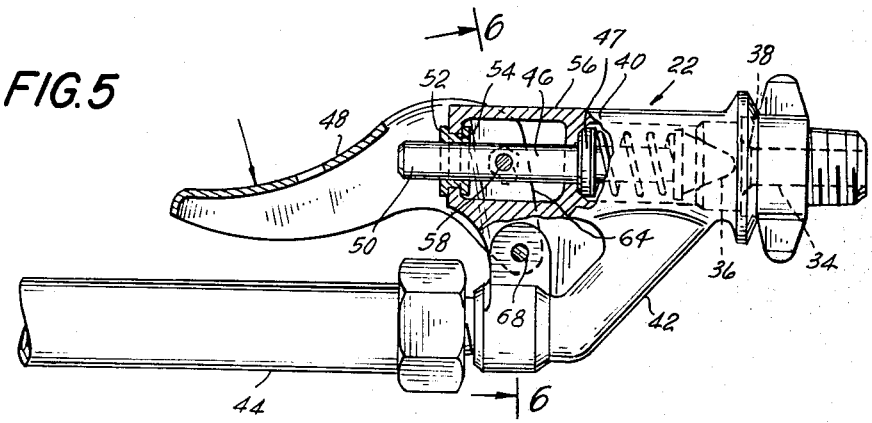
FIG. 5 is a similar side elevational view showing the disposition of internal parts upon depression of the lever to unseat the valve.
Figure 6:
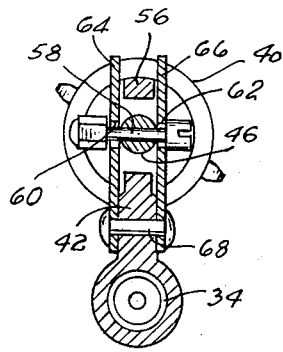
FIG. 6 is a cross-sectional view taken along the line 6—6 of FIG. 5.

In the drawings, a sprayer 10 is illustrated having particular application in the spraying of pesticides and similar liquid media. In this connection, sprayer 10 includes a substantially cylindrical tank 12 having a sealed base 14 and closed top head 16. A pump mechanism 18 is generally included as part of the sprayer for purposes of pressurizing the liquid contents of the tank 12. While under the influence of this internal pressure, the liquid is adapted to travel through the flexible hose 20. This liquid is then permitted to pass through the hand operated flow control valve 22 through the lance 28 and out through the spray nozzle 30 to the selected target area in accordance with the desired spray characteristics. The tank may, if desired, be carried by the sprayer operator to the desired location by means of the accommodating strap 32.

Referring now to the spray control valve 22, a liquid passage 34 communicating with the lance 28 and hose 20 is adapted to be closed and opened by means of a spraying biased valve member 36 through its relationship with valve seat 38 forming part of the valve body 40. This body 40 includes an angularly extending portion 42 defining part of the liquid passage 34. The handle 44 interposed between the hose 20 and the valve body portion 42 is grasped by the hand of the operator and facilitates operation of the valve 22.

A valve stem 46 extends rearwardly from the valve member 36 through a gasket or packing 47 outwardly of the valve body 40; and through the interengagement of thumb controlled lever 48, the stem is adapted to actuate the seating and unseating of the valve member 36. In this connection, the present invention incorporates structure providing a thrustless operation of the valve stem 46, and, consequently, the valve member 36 upon movement of the lever 48. Thus, the rear end 50 of the valve stem 46 is adapted to be disposed in a bearing 52 suitably fitted in opening 54. This opening is provided in an integral extension 56 of the valve body 40 and is in substantially coaxial relationship with respect to the axis of the valve stem 46. In this manner, a substantially linear movement of the valve stem is assured, notwithstanding the application of torques or other moments thereto.

The thumb control lever 48 is conveniently coupled with the rear end 50 of the valve stem by means of a pin 58 extending through the valve stem and slotted openings 60 and 62 of the bifurcated lever arm 64 and 66, respectively. These arms are also pivotally coupled with the valve body by means of the pivot pin 68 which extends through both the arms and the valve body.

Thus, the valve member is adapted to be in engagement with the valve seat 38 to close the valve as a result of the bias exerted by the compression spring ordinarily arranged in a concentric relationship about the valve stem 46. Upon pivotal movement of the lever 48 incident to a depressing of the lever downwardly towards the handle 44 by the thumb of the hand holding the lever, the valve stem 46 is adapted to be retracted to unseat the valve member 36 to permit liquid to flow through the valve passage 34.

This invention effectively minimizes the downward thrust and provides in essence, a thrustless type of valve in which the valve stem 46 travels and reciprocates along the intended path maintained by the valve body extension 56 and bearing 52. In this manner, the seal provided by gasket or packing 47 is assured under prolonged conditions of valve operation. In a preferred embodiment of the invention, the bearing 52 is preferably a gasket pressed into the opening 54. A plastic material having suitable properties may be employed for the gasket 52. Teflon, otherwise known as polytetrafluoroethylene is the preferred material because it is extremely tough, highly wear-resistant and impervious to all known chemicals employed in this spraying field. Another important advantage of this material is its inherent self-lubricity.

Thus, among others, the several aforenoted objects and advantages are most effectively attained. Although a single somewhat preferred embodiment of the invention has been disclosed and described in detail herein, it should be understood that this invention is in no sense limited thereby and its scope is to be determined by that of the appended claims.

I claim:

1. A sprayer of the type having a container of liquid under pressure to be sprayed, a flexible conduit leading from the container and communicating with the interior thereof for passage therethrough of the liquid under pressure, and a tube extension extending from the conduit and having a nozzle controlling the spray pattern of the liquid at the discharge end thereof, a leak-proof thrustless spray controled valve assembly interposed between the conduit and the tube extension, said valve assembly comprising a valve body having a forward end and a rear end and a sealing member at the rear end and having a passage therein for the liquid to be sprayed and a valve seat, means at the forward end of the valve body for coupling with the tube extension and means intermediate the forward and rear ends of the valve body for coupling with the conduit, a valve means shiftable in said body between a valve closed and open position at which the valve means is, respectively, in engagement with the valve seat to close said passage and spaced therefrom to open said passage, a valve stem extending rearwardly from the valve means through the sealing member and having a rear outer end disposed exteriorly of the valve body, said body having an extension at its rear end, said extension having an opening therein disposed in substantial coaxial relation with respect to the valve stem, the rear end of the valve stem being supported in said opening whereby the sealing member provides a substantially leak-proof seal between the valve stem and the rear end of the valve body during repeated operation of the valve, a spring in said valve body and disposed concentrically about the valve stem in urging the valve means forwardly into engagement with the valve seat, a lever coupled with the rear end of the valve stem, pivotal means pivotally mounting said lever whereby pivotal movement of the lever results in retraction of the valve stem and unseating of the valve means and release of said lever results in said spring returning the valve means into engagement with the valve seat, said body extension extending integrally from the body, the means for coupling the body with the conduit including an integral leg extending from said body at an acute angle relative thereto and containing part of said passage having an axis at an acute angle with respect to the axis of the valve stem, said leg having a rear portion, and a handle being coupled with said rear portion and extending substantially parallel with the axis of the valve stem and having a bore therein in communication with said passage.

2. The invention in accordance with claim 1 wherein a bearing is disposed in the extension opening for slidably receiving the rear end of the valve stem.

3. The invention in accordance with claim 2 wherein said bearing is formed of polytetrafluoroethylene.

4. The invention in accordance with claim 1 wherein the lever is pivotally mounted on the rear portion of the leg and with the rear end of the valve stem in such a manner whereupon pivotal movement of the lever towards the handle results in retraction of the valve stem and consequent unseating of the valve means.

5. The invention in accordance with claim 4 wherein said lever includes a pair of arms at its forward end each of which straddles said body extension and the rear end of the valve stem, each arm being pivotally connected with the rear portion of the leg and also being slotted, a pivot pin extending through the rear end of the valve stem and the slots in the arms of said lever to facilitate pivoting of the lever and consequent retraction of the valve stem.

References Cited

UNITED STATES PATENTS

| | | | |
|---|---|---|---|
| 2,039,933 | 5/1936 | Rupert | 251—233 |
| 2,567,527 | 9/1951 | Parks | 251—214 X |
| 2,670,241 | 2/1954 | Pyles | 239—583 X |
| 2,937,813 | 5/1960 | Rinkewich | 239—583 X |

WILLIAM F. O'DEA, *Primary Examiner.*

D. R. MATTHEWS, *Assistant Examiner.*